Sept. 28, 1965     E. P. ARTHUR ET AL     3,208,927
LIQUID JUNCTION
Filed Oct. 23, 1961
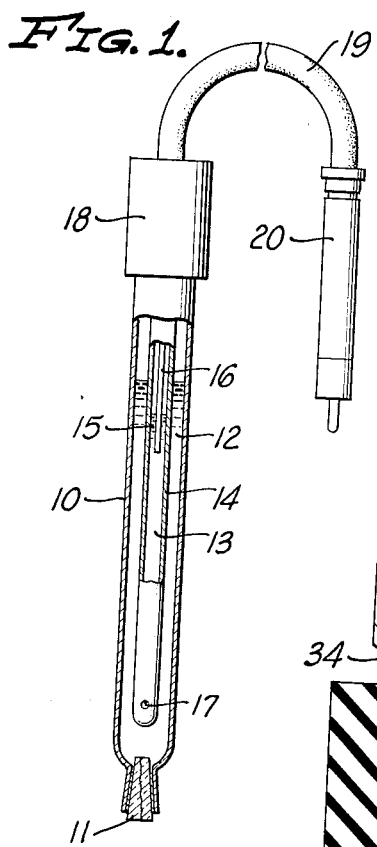
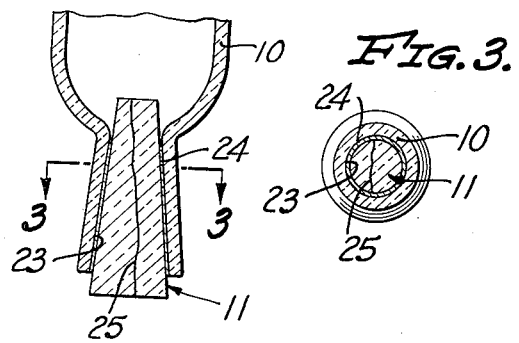
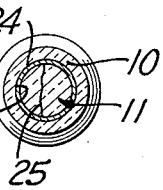
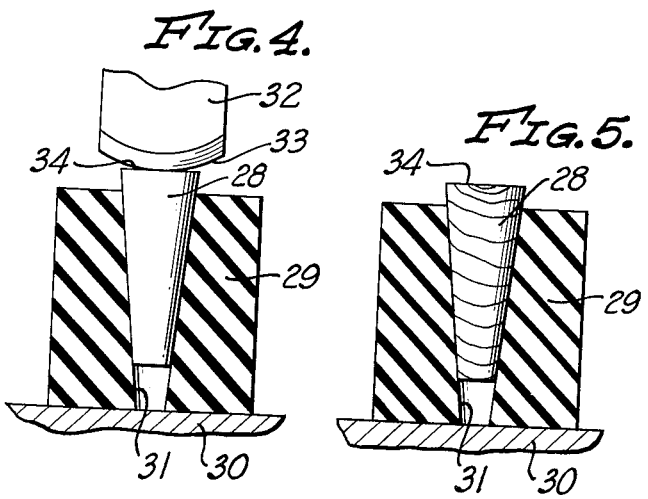
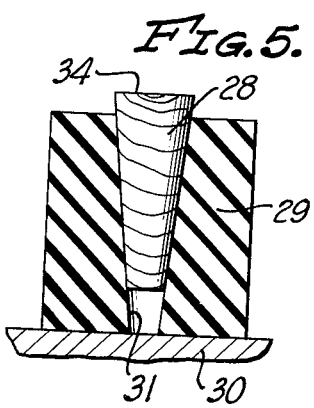
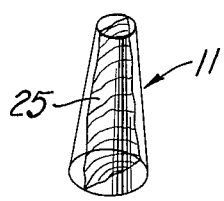
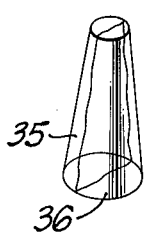
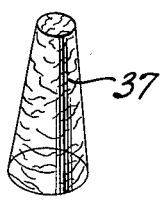
INVENTORS
EDWIN P. ARTHUR,
LYNN B. LEONARD
BY THEIR ATTORNEYS
HARRIS, KIECH, RUSSELL & KERN 3,208,927
LIQUID JUNCTION
Edwin P. Arthur and Lynn B. Leonard, Fullerton, Calif., assignors to Beckman Instruments, Inc., a corporation of California
Filed Oct. 23, 1961, Ser. No. 146,968
11 Claims. (Cl. 204—195)

This invention relates to articles incorporating minute passages between spaced zones and to methods for making articles with such minute passages. When used in electrochemistry, such passages are ordinarily referred to as leaks and the invention will be described herein as applied to liquid junctions in salt bridge tubes such as are used in reference electrodes for ion potential measurements in solutions.

In electrochemical measurements a reference electrode is commonly employed in conjunction with a measuring electrode, such as a glass electrode, with both electrodes immersed in a solution, whereby the potential between the two electrodes is a function of the concentration of a specific ion in the solution. A typical example is the conventional pH meter used for measuring hydrogen ion concentration in solutions. Typical leak structures for reference electrodes are shown in the U.S. Patents to Perley No. 2,345,498 and Arthur No. 2,705,220.

A reference electrode ordinarily comprises an internal half cell structure supported within a tube containing a salt solution, the tube of salt solution being known as a salt bridge. Electrical connection between the salt solution and the sample or test solution is made by liquid contact via a suitably formed aperture or passage in the tube. Sometimes the entire unit consisting of the internal half cell structure, the tube, the salt solution, and the liquid junction forming means is referred to as a half cell; however for the present specification, the structure immersed in the salt solution will be referred to as the half cell.

Various means have been utilized for forming the liquid junction, including agar-gel connections, wicking, fibers, small-bore tubes, glass tubes with cracks therein, and metal rods sealed in glass tubes. The liquid junction behavior must be substantially independent of the character of the test solution and must give substantially reproducible potentials. The liquid junction is ordinarily continuously renewed by flowing the salt solution from the tube into the test solution in a small stream to establish an interfacial or liquid junction zone. The structures referred to above have various objectionable features including slow and costly methods of manufacture, high rate of flow of salt solution, high electrical impedance, insufficient velocity to prevent infiltration of the test solution, relatively slow response when transferring from one solution to another, and instability and lack of reproducibility of results due to ill-defined and uncontrollable junction zones.

It is an object of the present invention to provide a new and novel leak structure which is easy to manufacture and use and which is inexpensive and durable. A further object is to provide a leak structure in which the size and hence the characteristics can be controlled and can be preselected by controlling the parameters of the structure. Another object is to provide new and novel methods of making such leak structures.

It is a particular object of the invention to provide a method of making a leak structure including the steps of forming a glass plug for an opening of a tube or container, fracturing the plug to provide a passage therethrough with complementary surfaces, and sealing the fractured plug in the opening with the passage between the complementary surfaces serving as the leak. A further object is to provide such a method wherein the plug is split into two pieces and then re-assembled and sealed in the opening. A further object is to provide various methods of fracturing and splitting the plug to provide the passage with the complementary surfaces.

It is an object of the invention to provide a new and novel leak structure including a nonconductive wall having an opening, and a plug of glass sealed in the opening, with the plug having a fracture therethrough with complementary surfaces defining a minute passage between opposite sides of the wall. A further object is to provide such a leak structure suitable for a liquid junction of a salt bridge tube or the like including a container having a tapered tubular opening, and a tapered plug sealed in the tapered opening, with the plug having a fracture therethrough with complementary surfaces defining a minute passage between the interior and exterior of the container.

Other objects, advantages, features and results of the invention will more fully appear in the course of the following description. The drawing merely shows and the description merely describes preferred embodiments of the present invention which are given by way of illustration or example.

In the drawing:
FIG. 1 is a side view, partly in elevation, showing a reference electrode incorporating the leak structure of the invention;
FIG. 2 is an enlarged sectional view of a portion of the structure of FIG. 1;
FIG. 3 is a sectional view taken along the line 3—3 of FIG. 2;
FIGS. 4 and 5 illustrate two steps in a process of making the leak structure;
FIG. 6 is an isometric view of a plug formed by the process of FIGS. 4 and 5; and
FIGS. 7 and 8 are isometric views of plugs formed by alternative processes.

The leak structure is described herein as used with a typical reference electrode for a pH meter. A tube 10, ordinarily of glass, is closed at the lower end with a plug 11 and contains a salt solution 12. A half cell 13 is positioned within the tube and is partially immersed in the salt solution. The particular half cell illustrated herein is a silver-silver chloride half cell and comprises a tube 14 with a silver chloride solution 15 and a silver wire 16 coated with silver chloride dipping into the solution 15. A small opening 17 is provided in the tube 14 for fluid communication with the solution 12. The electrode structure is closed with a cap 18 and a cable 19 provides an electrical connection between the wire 16 and a connector 20.

The plug 11 is shown in greater detail in FIGS. 2 and 3. The lower end of the tube 10 has a tapered tubular opening 23. The plug 11 preferably has a corresponding taper so as to substantially fill the opening and is sealed in place in the opening. Sealing may be accomplished by conventional means as by a silicone rubber cement or an epoxy resin or a glass solder. The sealing material should have a relatively high electrical resistance and be substantially insoluble in the solutions with which the structure will be used.

In the preferred form shown in FIGS. 2 and 3, the plug is formed of glass with a fracture 25 therethrough. The fracture divides the plug into two pieces with complementary or mating surfaces resulting in a very small passage through the plug along the complementary surfaces. One end of the fracture 25 terminates within the tube 10 above the sealing material 24 while the other end terminates on the exterior of the tube, thus providing the desired passage or leak structure.

The preferred form of the invention is shown herein as a tube with a tapered opening and a tapered plug, but it should be noted that the invention is equally useable with any type of container or wall structure and that any shape of opening and plug may be utilized. The word "tube" is used herein and in the claims to means any suitable container or barrier for the fluid which flows through the leak structure.

The fractured plug 11 may be made as follows. A plug is formed to the shape necessary for substantially filling the opening as by molding or grinding. The dimensional tolerances for this operation are quite broad, as the plug will be sealed in the opening by cementing or the like. Hence conventional high speed molding processes may be used.

The plug is then fractured by impact. Referring to FIG. 4, an unfractured plug 28 is placed in a rubber form 29 resting on a base 30. The form 29 has a tapered opening 31 corresponding to the taper of the plug to receive the plug so that the rubber form will resiliently support the plug. A blade 32 with a tungsten carbide edge 33 is positioned above the plug and is located to contact the plug at the center of the upper surface 34. In the particular machine shown herein, the blade is raised about twelve inches above the plug and permitted to fall due to the force of gravity. The resulting impact produces a fracture such as is shown in FIGS. 5 and 6, and separates the plug into two pieces with complementary surfaces.

The fractured plug is removed from the form and, with the complementary surfaces in engagement, is inserted into the opening of the tube and sealed in place.

In an alternative method of forming the plug, the plug may be molded of two glasses 35, 36 (FIG. 7) with different temperature coefficients of expansion. This molded plug may then be fractured by heating or cooling, separating the plug into two pieces having complementary surfaces. This fractured plug is used in the same manner as the plug formed by impact.

A plug formed by another alternative method is shown in FIG. 8. The unfractured plug is made to the desired shape of a single piece of glass. The glass is then fractured by thermal shock producing a network of cracks 37 yielding a plurality of complementary surfaces which produce one or more parallel passages through the plug.

In the present invention, the leak is entirely within the plug and hence the characteristics of the leak are dependent on the characteristics of the plug and independent of the supporting tube. The size of the leak can be closely controlled by selecting an appropriate length and/or diameter for the plug and mating opening. There are no close tolerances or exacting assembly steps involved in the manufacture of the leak structure and the resulting electrode is quite rugged and durable. The resultant product does not have any incipient cracks or inherent weak points and is excellently suited for production and commercial applications as well as for laboratory use.

In one specific embodiment of the invention, tapered plugs of Corning Pyrex glass No. 7740, about one and one-quarter inches long and tapering from about one-half inch to about five-sixteenths inch, were fractured by impact in the manner shown in FIGS. 4 and 5. A fractured plug was sealed in a tube as shown in FIGS. 2 and 3. The tube was filled with a saturated potassium chloride solution and was dipped into another saturated potassium chloride solution. A gravity head of about five inches of water was maintained on the leak. The resistance of the leak was in the range of 3,000 to 5,000 ohms. The rate of flow of solution from the tube was between one and five milliliters per day over a seven-day test period.

In another specific embodiment, a plug of borosilicate glass twelve millimeters long, tapering from ten to nine millimeters was fractuerd by thermal shock. The plug was heated to 500° C. and then dipped into water at room temperature, producing the network of fractures. The fractured plug was sealed in a tube and was tested with four normal potassium chloride solutions. The D.C. resistance was 32,000 ohms at 23° C. The rate of flow of solution through the leak was less than two milliliters per day under a head of ten pounds per square inch.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. A method of making a leak structure for a liquid junction of a salt bridge tube, including the sequential steps of:
   forming a glass plug for an opening of a tube;
   fracturing the plug to provide a passage therethrough with complementary mating surfaces;
   and sealing the fractured plug in the opening to provide a leak for the tube along the complementary mating surfaces.

2. A method of making a leak structure for a liquid junction of a salt bridge tube, including the sequential steps of:
   forming a glass plug for an opening of a tube; fracturing the plug into a plurality of pieces with complementary surfaces;
   mating the pieces at the complemetary surfaces to reform the plug;
   and sealing the reformed plug in the opening to provide a leak for the tube along the complementary mating surfaces.

3. A method of making a leak structure for a liquid junction of a salt bridge tube including the sequential steps of:
   forming a glass plug for an opening of a tube;
   splitting the plug into two pieces by impact with a sharp edge to provide a passage therethrough with complementary surfaces;
   mating the pieces at the complementary surfaces to reform the plug;
   and sealing the reformed plug in the opening to provide a leak for the tube along the complementary mating surfaces.

4. A method of making a leak structure for a liquid junction of a salt bridge tube, including the sequential steps of:
   forming a glass plug for an opening of a tube;
   heating the plug to an elevated temperature;
   rapidly cooling the heated plug for producing thermal shock to fracture the plug to provide at least one passage therethrough with complementary mating surfaces;
   and sealing the fractured plug in the opening to provide a leak for the tube along the complementary mating surfaces.

5. A method of making a leak structure for a liquid junction of a salt bridge tube, including the sequential steps of:
   forming a plug for an opening of a tube, with the plug comprising two glasses of different temperature coefficients of expansion and meeting along a surface;
   subjecting the plug to thermal shock to fracture the plug at said surface into two pieces;
   mating the pieces at said surface to reform said plug;
   and sealing the reformed plug in the opening to provide a leak for the tube along said surface.

6. In combination:
   a salt bridge tube of nonconductive material having an opening therein; and
   a plug solely of glass sealed in said opening, said plug having a fracture therethrough with complementary mating surfaces defining a minute passage between the interior and exterior of said tube.

7. In combination:
a salt bridge tube of nonconductive material having an opening therein; and
a plug solely of glass sealed in said opening, said plug having a fracture separating the plug into two pieces with complementary surfaces, said two pieces of said plug being mated in said opening to provide between said complementary surfaces a minute passage between the interior and exterior of said tube.

8. In combination:
a salt bridge tube of nonconductive material having an opening therein; and
a plug solely of glass sealed in said opening, said plug having a plurality of fractures therein with complementary mating surfaces defining at least one passage therethrough to provide a leak between the interior and exterior of said tube.

9. In combination:
a salt bridge tube of nonconductive material having an opening therein; and
a plug solely of glass sealed in said opening, said plug comprising two pieces of glass meeting at complementary surfaces, said two pieces of said plug being mated in said opening to provide between said complementary surfaces a minute passage between the interior and exterior of said tube.

10. In combination:
a salt bridge tube of nonconductive material having a tapered tubular opening therein; and
a tapered plug solely of glass sealed in said tapered opening, said plug having a fracture therethrough with complementary mating surfaces defining a minute passage between the interior and exterior of said tube.

11. In combination:
a salt bridge tube of nonconductive material having a tapered tubular opening therein; and
a tapered plug solely of glass sealed in said tapered opening, said plug comprising two pieces of glass mating at complementary surfaces, said two pieces of said plug being mated in said opening to provide between said complementary surfaces a leak between the interior and exterior of said tube.

References Cited by the Examiner

UNITED STATES PATENTS

| | | | |
|---|---|---|---|
| 1,779,232 | 10/30 | Handforth | 204—195 |
| 2,058,761 | 10/36 | Beckman et al. | 204—195.1 |
| 2,345,498 | 3/44 | Perley | 204—195 |
| 2,387,727 | 10/45 | Godshalk | 204—195.1 |
| 2,705,220 | 3/55 | Arthur | 204—195 |
| 2,925,370 | 2/60 | Rohrer | 204—195 |
| 2,927,887 | 3/60 | Proctor | 204—195 |

WINSTON A. DOUGLAS, *Primary Examiner.*

JOHN R. SPECK, MURRAY TILLMAN, *Examiners.*